(12) United States Patent
Scaini et al.

(10) Patent No.: US 10,166,714 B2
(45) Date of Patent: Jan. 1, 2019

(54) ROLLER AND METHOD FOR COMPRESSING PROTECTIVE SHEETING OF POLYMER MATERIAL AROUND A PIPELINE

(71) Applicant: SAIPEM S.p.A., San Donato Milanese (IT)

(72) Inventors: Cristian Scaini, San Donato Milanese (IT); Valerio Bregonzio, San Giuliano Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 267 days.

(21) Appl. No.: 15/029,550

(22) PCT Filed: Oct. 17, 2014

(86) PCT No.: PCT/IB2014/065426
§ 371 (c)(1),
(2) Date: Apr. 14, 2016

(87) PCT Pub. No.: WO2015/056242
PCT Pub. Date: Apr. 23, 2015

(65) Prior Publication Data
US 2016/0257064 A1    Sep. 8, 2016

(30) Foreign Application Priority Data

Oct. 17, 2013   (IT) .............................. MI2013A1739

(51) Int. Cl.
*F16L 13/02*      (2006.01)
*F16L 58/02*      (2006.01)
(Continued)

(52) U.S. Cl.
CPC ............ *B29C 63/06* (2013.01); *B29C 63/048* (2013.01); *B29C 65/3656* (2013.01);
(Continued)

(58) Field of Classification Search
CPC ....... B29C 63/06; B29C 63/14; B29C 63/048; B29C 53/56; B29C 53/562; B29C 53/566;
(Continued)

(56) References Cited

U.S. PATENT DOCUMENTS 3,547,731 A      12/1970   Stuart, Jr. et al.
3,750,246 A  *   8/1973   Pessen ................. D06B 23/021
                                                              492/53
(Continued)

FOREIGN PATENT DOCUMENTS

EP      1 016 514       7/2000
EP      1 985 909       10/2008
(Continued)

OTHER PUBLICATIONS

Australian Office Action for Australian Patent Application No. 2014335746 dated Nov. 14, 2017 (3 Pages).
(Continued)

*Primary Examiner* — Carson Gross
(74) *Attorney, Agent, or Firm* — Neal, Gerber & Eisenberg LLP (57) ABSTRACT

A roller for compressing protective sheeting of polymer material around a pipeline rotates about a given or designated axis of rotation and has a shaft; and a first tubular portion which extends about the shaft and varies in elasticity along the given or designated axis of rotation; more specifically, the first tubular portion is of greater elasticity at the ends of the roller than at the center of the roller.

28 Claims, 4 Drawing Sheets

(51) Int. Cl.
| | |
|---|---|
| *B29C 63/06* | (2006.01) |
| *B32B 37/00* | (2006.01) |
| *F16L 58/18* | (2006.01) |
| *B29C 63/04* | (2006.01) |
| *B29C 65/00* | (2006.01) |
| *F16C 13/02* | (2006.01) |
| *B29C 65/36* | (2006.01) |
| *B29C 65/46* | (2006.01) |
| *B29C 53/56* | (2006.01) |
| *F16L 58/10* | (2006.01) |
| *B29K 23/00* | (2006.01) |
| *B29L 23/00* | (2006.01) |
| *B29K 105/24* | (2006.01) |

(52) U.S. Cl.
CPC .......... *B29C 65/46* (2013.01); *B29C 66/1122* (2013.01); *B29C 66/1222* (2013.01); *B29C 66/1226* (2013.01); *B29C 66/5326* (2013.01); *B29C 66/652* (2013.01); *B29C 66/81431* (2013.01); *B29C 66/81461* (2013.01); *B29C 66/8362* (2013.01); *F16C 13/022* (2013.01); *F16L 13/0272* (2013.01); *F16L 58/181* (2013.01); *B29C 53/562* (2013.01); *B29K 2023/06* (2013.01); *B29K 2023/12* (2013.01); *B29K 2105/243* (2013.01); *B29L 2023/22* (2013.01); *B29L 2023/225* (2013.01); *B32B 37/0053* (2013.01); *F16L 58/109* (2013.01); *F16L 58/1054* (2013.01); *F16L 58/1063* (2013.01)

(58) Field of Classification Search
CPC .. B29C 66/8362; B32B 37/0053; F16L 13/02; F16L 13/0218; F16L 13/0236; F16L 13/0254; F16L 13/0272; F16L 58/1054; F16L 58/1063; F16L 58/109; F16L 58/181
See application file for complete search history.

(56) References Cited

U.S. PATENT DOCUMENTS

| | | | | |
|---|---|---|---|---|
| 3,840,958 | A * | 10/1974 | Mahn | B29C 33/044 492/6 |
| 4,864,343 | A * | 9/1989 | Nelson | G03F 7/0027 100/162 B |
| 7,810,539 | B2 * | 10/2010 | Mischler | B29C 70/382 156/574 |
| 2012/0199627 | A1 * | 8/2012 | Newhouse | B65H 20/02 226/181 |

FOREIGN PATENT DOCUMENTS

| | | |
|---|---|---|
| FR | 2153871 | 5/1973 |
| WO | WO 93/17857 | 9/1993 |
| WO | WO 2008/071773 | 6/2008 |
| WO | WO 2010/049353 | 5/2010 |
| WO | WO 2011/033176 | 3/2011 |

OTHER PUBLICATIONS

International Search Report and Written Opinion for International Application No. PCT/IB2014/065426 dated Feb. 2, 2015.
Notification Concerning Submission, Obtention or Transmittal of Priority Document (Form PCT/IB/304) for International Application No. PCT/IB2014/065426 dated Jan. 28, 2015.

* cited by examiner

FIG. 1

ROLLER AND METHOD FOR COMPRESSING PROTECTIVE SHEETING OF POLYMER MATERIAL AROUND A PIPELINE

PRIORITY CLAIM

This application is a national stage application of PCT/IB2014/065426, filed on Oct. 17, 2014, which claims the benefit of and priority to Italian Patent Application No. MI2013A 001739, filed on Oct. 17, 2013, the entire contents of which are each incorporated by reference herein.

BACKGROUND

The joining operation of underwater pipelines to be laid on the bed of a body of water comprises welding the metal cylinders together, normally with a plurality of weld passes; and coating the cutback. Once an annular weld bead is formed between two adjacent metal cylinders, the cutback extends astride the annular weld bead, along an uncoated portion. In other words, the cutback is substantially defined by the free ends of the pipes, extends axially between two end portions of the protective coatings, and must be coated with a protective coating to prevent corrosion.

Coating the unprotected portion along the cutback is known as 'Field Joint Coating', and comprises coating the cutback with normally three coats of polymer material, to protect and ensure adhesion of the coats to the metal cylinders.

For example, coating the unprotected cutback comprises heating the cutback, such as to a temperature of 180° C.-250° C.; spraying the cutback with powdered epoxy resin (FBE—Fusion Bonded Epoxy) which, in contact with the cutback, forms a relatively thin first coat or 'primer' measurable in tenths of a millimeter (mm), spraying over the first coat on the cutback a modified adhesive copolymer which, in contact with the first coat, forms a relatively thin second coat, also measurable in tenths of a mm; and applying a third so-called 'top coat' which overlaps the pre-existing protecting coatings.

Welding, non-destructive weld testing, and coating the unprotected cutback are carried out at work stations equally spaced along the path of the pipes (or of the pipeline being constructed, if the pipes are joined to the latter). So the pipes are conveyed in steps, and stopped for a given length of time at each work station.

One known method of applying the third coat is to wind thick, 2-10 mm thick, protective sheeting about the cutback. The protecting sheeting is extruded, and is simultaneously wound about the cutback as it is formed. This method is described in the Applicant's PCT Patent Application WO 2008/071773 and in EP Patent Application EP 1,985,909, PCT Patent Application WO 2010/049353, and PCT Patent Application WO 2011/033176. In the methods described in these documents, the protective sheeting is applied by an extrusion outlet mounted on a carriage which runs along an annular path about the longitudinal axis of the pipeline, and the polymer material is plastified by a plastifying device located close to the pipeline and either connectable selectively to the extrusion outlet, or connected to it by a hose or semirigid pipe.

The protective sheeting is applied over the second coat and over two opposite end portions of the pre-existing coatings, and is pressed onto the pipeline to make sure it adheres properly. Because the end portions of the pre-existing coatings define raised areas with respect to the cutback, the surface onto which the protective sheeting is applied is not perfectly flat, so it is difficult to ensure the roller exerts even pressure on the sheeting as a whole.

In the case described, the weld bead also defines a ring with respect to the adjacent parts of the cutback. As such, the types of rollers described in certain of the known art fail to ensure even pressure over the protective sheeting as a whole.

SUMMARY

The present disclosure relates to a roller configured to compress protective sheeting of polymer material about a pipeline, and in particular about a cutback of a pipeline.

More specifically, the roller of the present disclosure is employed in pipeline construction, in particular the construction of underwater pipelines to be laid on the bed of a body of water, and to which the following description refers purely by way of example. Underwater pipelines are normally constructed by joining the facing free ends of adjacent pipes aligned along a longitudinal axis to define a cutback; and winding protective sheeting about the cutback. Pipelines, in fact, are composed of pipes joined to one another to cover distances of hundreds of kilometers. The pipes are of normally 12-meter standard length and of relatively large diameter ranging from 0.2 to 1.5 meters. Each pipe comprises a metal cylinder; and a polymer coating configured to protect the metal cylinder, and which extends along the pipe, leaving the opposite ends of each pipe free, so the metal cylinders can be welded to one another. The pipes may be joined at land-based installations, or on laying vessels which also provide for laying the pipeline as the pipeline is constructed.

It is an advantage of the present disclosure to provide a roller configured to reduce certain of the drawbacks of certain of the known art, and in particular to effectively compress the protective sheeting onto the pipeline without spreading or flattening the sheeting.

According to the present disclosure, there is provided a roller configured to compress protective sheeting of polymer material around a pipeline, the roller rotating about a given or designated axis of rotation and comprising a shaft; and at least one first tubular portion which extends about the shaft and varies in elasticity along the given or designated axis of rotation.

The first tubular portion thus ensures the roller deforms elastically according to the shape of the surface with which the roller is brought into contact. In other words, a roller is achieved in which its elasticity is appropriately adapted to the contour of the surface onto which the roller is pressed.

In certain embodiments, the first tubular portion comprises a plurality of tubular members arranged end to end along the axis of rotation. In certain such embodiments, each two adjacent tubular members differ in elasticity.

The varying elasticity of the roller is advantageously achieved by employing adjacent tubular members of different degrees of elasticity.

In certain embodiments, the first tubular portion comprises two lateral tubular members of greater elasticity than the adjacent tubular member.

Each lateral tubular member is sized so as to be slightly longer than the respective portion of protective sheeting overlapping an end portion of the pre-existing protective coating.

Roughly speaking, the parts of the roller configured to press onto the end portions of the pre-existing protective coatings are of greater elasticity than the adjacent parts, to enable for the projection formed by said end portions.

Construction-wise, each tubular member comprises a tubular layer of elastic material, such as silicone.

In certain embodiments, the tubular layer has axial openings equally spaced about the given or designated axis of rotation.

The elasticity of the tubular layer may advantageously be defined by selecting the hardness of the elastic material and/or the number or quantity of the openings and/or size of the openings.

In certain embodiments, each tubular member comprises a rigid sleeve supporting the tubular layer and fitted to the shaft. This solution makes the tubular members easily interchangeable as required.

In certain embodiments, the roller comprises a second tubular portion, which is fitted about the first tubular portion and comprises a plurality of rigid cylindrical walls movable with respect to one another and arranged end to end along the given or designated axis of rotation. In other words, the second tubular portion allows no deformation of the circular or cylindrical shape of the roller, and limits the contact area between the roller and the underlying surface.

The cylindrical walls are movable mainly radially with respect to the axis of rotation of the roller, and by the amount permitted by the elasticity of the first tubular portion.

In certain embodiments, the second tubular portion comprises a central cylindrical wall with a groove which, in use, may advantageously be positioned over the annular weld bead.

Alternatively, the second tubular portion comprises a plurality of adjacent central cylindrical walls, each slidable radially, with reference to the axis of rotation, with respect to the adjacent cylindrical walls.

The radial movement of the central cylindrical walls thus provides for adequately accommodating the weld bead without deforming the protective sheeting. And, since the axial extension as a whole of the central cylindrical walls is greater than that of the weld bead, precise axial positioning of the roller with respect to the weld bead is not necessary.

In certain embodiments, the second tubular portion comprises two intermediate cylindrical walls located at opposite ends of the central cylindrical wall or the central cylindrical walls. This configuration makes the two parts of the roller, configured to be positioned, in use, with their free ends on opposite sides of the annular weld bead, independent of each other. The intermediate walls also make the second tubular portion relatively easier to assemble.

In certain embodiments, the second tubular portion comprises a plurality of lateral cylindrical walls located at opposite ends of the roller. This solution makes the roller highly deformable radially, without locally flattening the outer surface of the roller.

In certain embodiments of the present disclosure, the roller comprises an elastic sheath fitted about the second tubular portion.

The sheath imparts to the roller a smooth, continuous outer surface, even when, for example, the cylindrical walls are offset axially with respect to one another. In certain embodiment, the sheath is relatively thin.

A further advantage of the present disclosure is to provide a method of compressing polymer sheeting onto a pipeline, configured to reduce certain of the drawbacks of certain of the known prior art.

According to the present disclosure, there is provided a method of compressing protective sheeting of polymer material around a pipeline; the pipeline extending along a longitudinal axis and comprising a cutback bounded by two end portions of respective protective coatings, which define raised parts with respect to the cutback; and the method comprising the steps of positioning a roller at the cutback, with the axis of rotation of the roller parallel to the longitudinal axis, and with the opposite ends of the roller at the end portions of the protective coatings; winding about the pipeline protective sheeting made of partly cross-linked polymer material and wide enough to overlap the end portions; and gripping the protective sheeting of polymer material between the roller and the pipeline, so as to deform the roller at the end portions. In this way, when force is applied to the roller in the direction of the pipeline, more or less even pressure is achieved across the whole width of the protective sheeting. Also, appropriately selecting the force applied to the roller prevents any alteration in the thickness of the protective sheeting.

More specifically, the method comprises deforming the directrices of the roller, leaving the cylindrical shape of the roller unchanged. This way, the contact area between the roller and the protective sheeting does not depend on the degree of deformation of the roller.

More specifically, the cutback has a projecting weld bead; and the method comprises deforming the roller at the weld bead. In this way, a certain amount of tolerance is allowed as regards the axial position of the roller with respect to the weld bead.

In certain embodiments, the method comprises moving the roller at constant pressure about the pipeline. This way, even pressure can be exerted over the whole extension of the protective sheeting.

Additional features and advantages are described in, and will be apparent from the following Detailed Description and the figures.

BRIEF DESCRIPTION OF THE DRAWINGS

Certain embodiments of the present disclosure will be described by way of example with reference to the attached drawings, in which.

DETAILED DESCRIPTION

Figure 1:
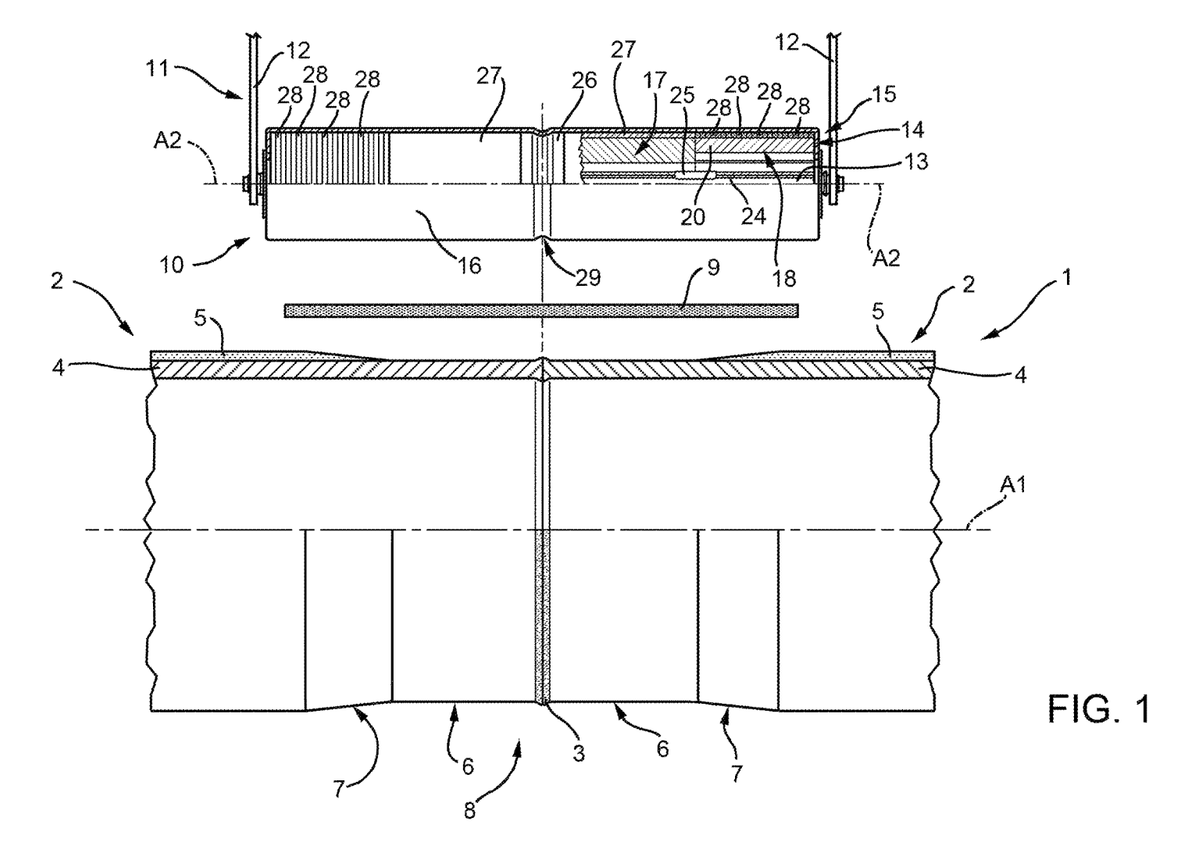
FIG. 1 shows a partly exploded elevation, with parts removed for clarity, of the roller according to the present disclosure, the pipeline, and the protective sheeting.

Referring now to the example embodiments of the present disclosure illustrated in FIGS. 1 to 7, number 1 in FIG. 1 indicates a pipeline composed of two pipes 2 joined by a weld, of which is shown an annular weld bead 3. Each pipe 2 comprises a metal cylinder 4; and a coating 5 of polymer material, normally polyethylene or polypropylene, for corrosion-proofing metal cylinder 4.

Each pipe 2 has two opposite free ends 6 with no coatings 5. Each coating 5 has an end portion 7 including a bevel which reduces the thickness of coating 5 gradually to zero towards free end 6. Two pipes 2 welded together form a cutback 8, which extends along a longitudinal axis A1, between two end portions 7.

In addition to welding metal cylinders 4, joining pipes 2 also comprises coating cutback 8. This comprises grit-blasting cutback 8; heating, such as via induction heating, cutback 8 to a temperature of 180° C.-250° C., and applying protective sheeting 9 of polymer material to cutback 8 to form a layer (not shown in FIG. 1). Coating cutback 8 normally comprises applying two relatively very thin layers of polymer material—the first with anticorrosion and the second with adhesive properties—to cutback 8 before applying protective sheeting 9.

In the example shown, protective sheeting 9 is configured to wind around cutback 8, is wider than cutback 8 (measured along longitudinal axis A1) so as to overlap end portions 7 of coatings 5 of the two joined pipes 2, and is long enough to wind completely around the perimeter of cutback 8.

Protective sheeting 9 is extruded as protective sheeting is wound about pipeline 1, and is compressed onto pipeline 1 by a roller 10.

Protective sheeting 9 is applied before the polymer is completely cross-linked, so protective sheeting is relatively highly flexible and adapts to the irregular shape of the part of pipeline 1 to which protective sheeting is applied. Roller 10 ensures protective sheeting 9 adheres to the surface of pipeline 1 to which protective sheeting is applied, and prevents the formation of air bubbles, without altering the thickness of protective sheeting 9 as protective sheeting is applied.

Roller 10 rotates idly, or is powered to rotate, about an axis of rotation A2, and is pushed onto pipeline 1 by a supporting mechanism 11, of which only two supporting arms 12 are shown in FIG. 1.

Figure 2:
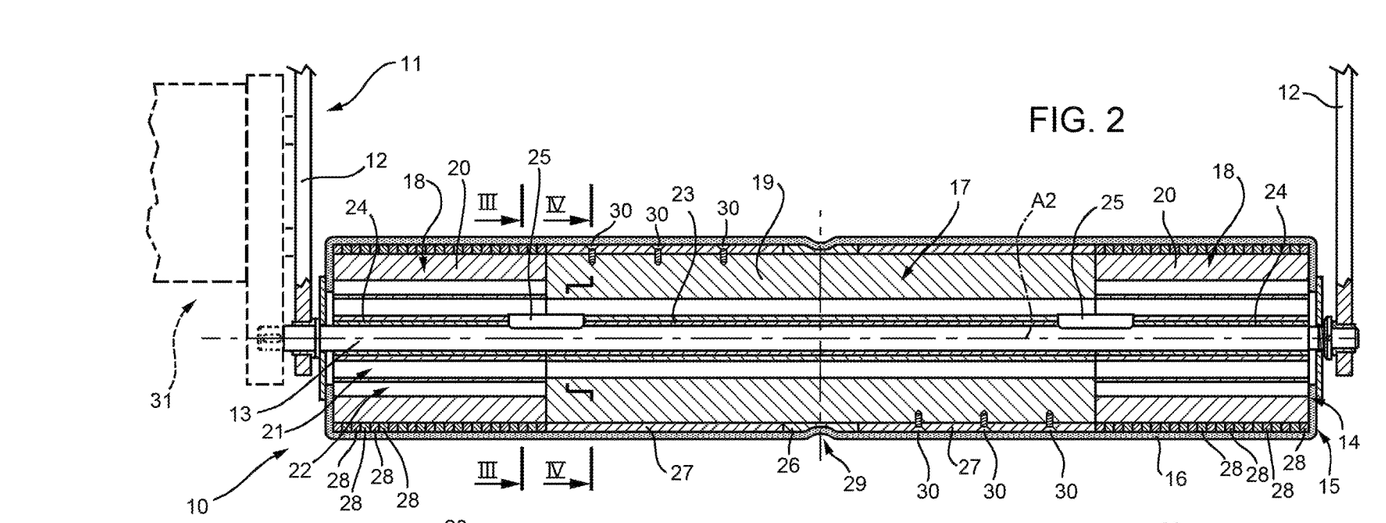
FIG. 2 shows a larger-scale longitudinal section, with parts removed for clarity, of the FIG. 1 roller.

With reference to FIG. 2, roller 10 comprises a rigid supporting shaft 13; a flexible tubular portion 14 around shaft 13; and a rigid tubular portion 15 around tubular portion 14.

In certain embodiments, roller 10 comprises an elastic sheath 16 covering tubular portion 15.

Tubular portion 14 varies in elasticity along axis of rotation A2. More specifically, tubular portion 14 is of greater elasticity at the ends of roller 10 than at the center of roller 10. It should be appreciated that the more elastic part of tubular portion is located at the ends of roller 10 and configured to compress protective sheeting 9 onto end portions 7 of coatings 5.

Tubular portion 14 comprises a plurality of tubular members 17, 18 arranged end to end along axis of rotation A2.

In the example shown, tubular portion 14 has a central tubular member 17; and two lateral tubular members 18 of greater elasticity than central tubular member 17.

Tubular members 17 and 18 comprise respective tubular layers 19 and 20 of elastic material, such as silicone.

Figure 3:
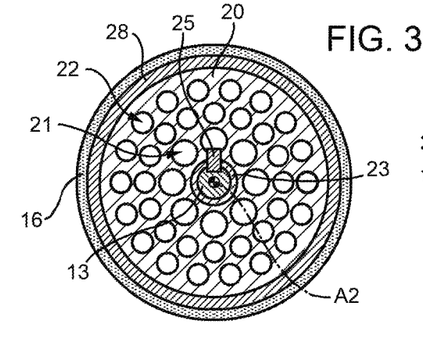
FIGS. 3 and 4 show cross sections, with parts removed for clarity, of the FIG. 2 roller along lines III-III and IV-IV respectively.
Figure 4:
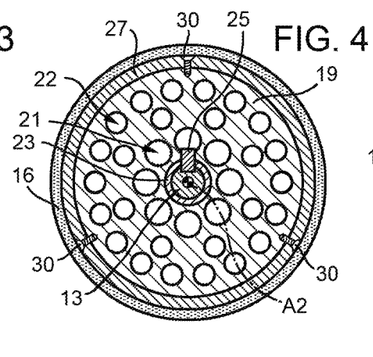

With reference to FIGS. 3 and 4, tubular layers 19 and 20 have axial openings 21 and 22, which, in the example shown, are defined by holes and equally spaced around axis of rotation A2. The degree of elasticity of tubular layers 19 and 20 depends on the elastic material used, the number or quantity of openings 21 and 22, and the shape and size of the cross section of openings 21 and 22.

Figure 5:
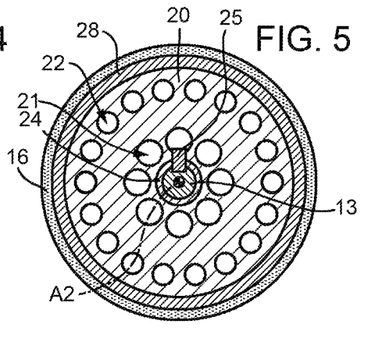
FIG. 5 shows a cross section, with parts removed for clarity, of a variation of the roller according to the present disclosure.

FIG. 5 shows a variation of roller 10 with a different distribution pattern of openings 21 and 22.

Tubular members 17 and 18 comprise respective sleeves 23 and 24, which support respective tubular layers 19 and 20, and are fitted to shaft 13, such as locked by key couplings 25.

In certain embodiments, tubular layers 19 and 20 are cured to respective sleeves 23 and 24, which are made of metal.

Tubular portion 15 as a whole forms a cylindrical shell fitted around tubular portion 14, and comprises a plurality of rigid cylindrical walls 26, 27, 28 of the same outside diameter and thickness, and arranged end to end. In a variation not shown, cylindrical walls 26, 27, 28 are of different thicknesses.

In the example shown, tubular portion 15 comprises a central cylindrical wall 26 with a groove 29; and two intermediate cylindrical walls 27 at opposite ends of central cylindrical wall 26.

Central cylindrical wall 26 and intermediate cylindrical walls 27 are fitted to central tubular member 17.

In a variation not shown, intermediate walls 27 are eliminated, and central wall 26 is the same axial length as central tubular member 17.

Central wall 26 and the two intermediate walls 27 make roller 10 easier to assemble.

Tubular portion 15 comprises a plurality of cylindrical end walls 28 fitted to lateral tubular members 18.

Cylindrical walls 28 are much smaller axially than cylindrical walls 26 and 27, so much so as to actually define respective rings.

Sheath 16 is fitted around tubular portion 15 and covers all of cylindrical walls 26, 27, 28.

Cylindrical walls 27 may be connected to tubular member 17 by fastening members 30 (e.g., screws).

Roller 10 may be idle, or powered by a reversible actuator 31.

Figure 6:
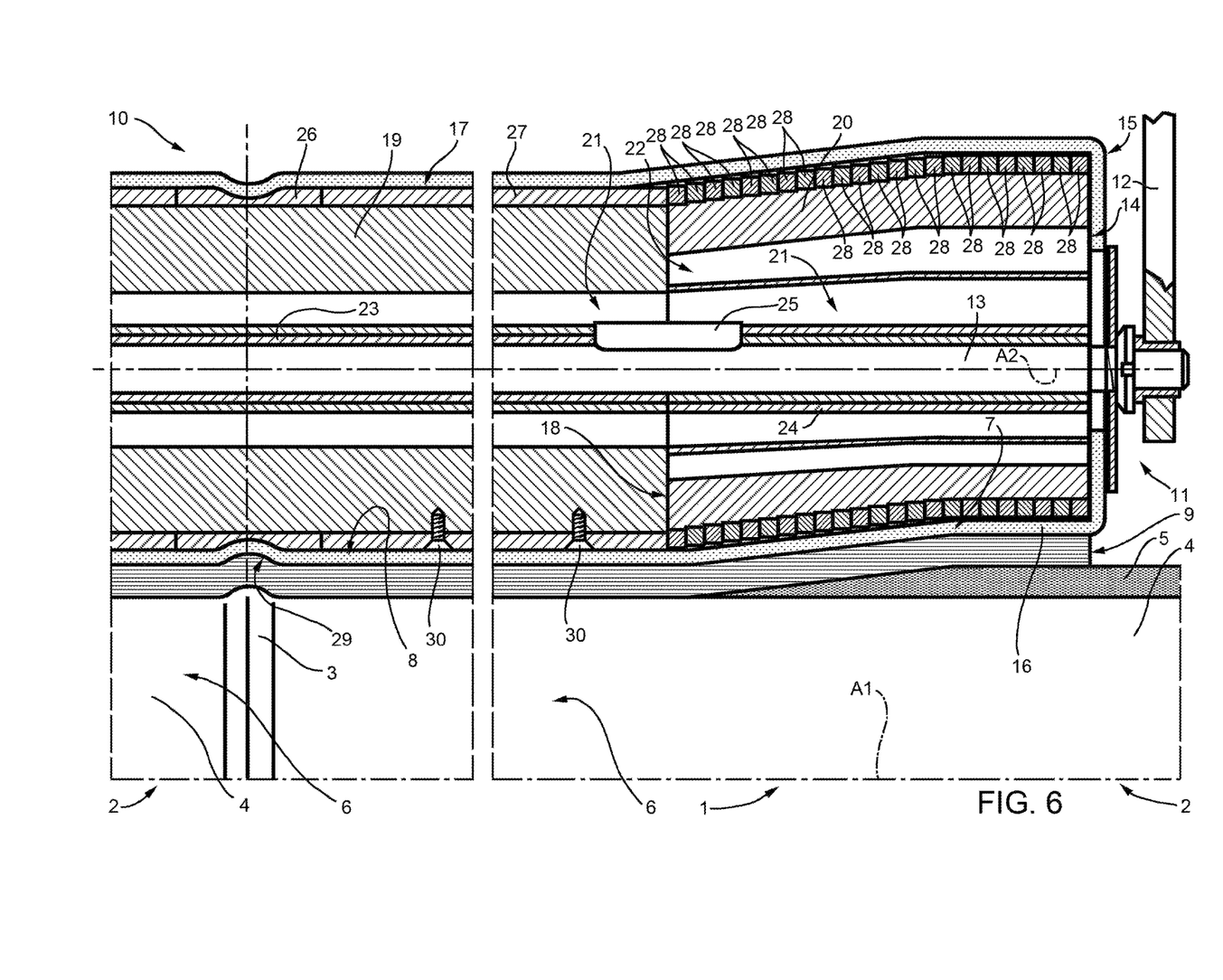
FIG. 6 shows a partly sectioned, larger-scale elevation, with parts removed for clarity, of a detail of the FIG. 2 roller when compressing the protective sheeting onto the pipeline.

In actual use, and as shown in FIG. 6, protective sheeting 9 is compressed slightly between roller 10 and pipeline 1 at cutback 8. Roller 10 is sized and positioned axially so that groove 29 is located at weld bead 3, and lateral tubular members 18 are located at end portions 7 of coatings 5. The pressure exerted by roller 10 must be such as not to alter the thickness of protective sheeting 9. For this reason, a compressive force configured not to alter the thickness of protective sheeting 9 has been determined, and roller 10 is configured to yield easily where projecting parts are expected.

At end portions 7 of coatings 5, roller 10 deforms considerably. More specifically, elastic deformation occurs at tubular layer 20, and cylindrical walls 28 move radially with respect to axis of rotation A2. More specifically, cylindrical walls 28 at the bevel slide radially with respect to one another to substantially match the shape of the bevel. Sheath 16 deforms elastically and imparts to roller 10 a smooth, continuous outer surface, regardless of the position of cylindrical walls 26, 27, 28. More specifically, relative radial slide of cylindrical walls 26, 27, 28 forms steps, but these do not alter the surface of protective sheeting 9, on account of cylindrical walls 26, 27, 28 being enclosed in sheath 16.

The elasticity of tubular layers 19 and 20 is determined experimentally, by selecting the type of material and the number or quantity, shape, and size of openings 21, 22 on the basis of the thickness of coatings 5, and so as to exert substantially even pressure over the full width of protective sheeting 9.

When tubular portion 14 deforms, tubular portion 15 maintains its circular cross section, so the contact area between roller 10 and protective sheeting 9 is independent of the degree of deformation of roller 10.

Figure 7:
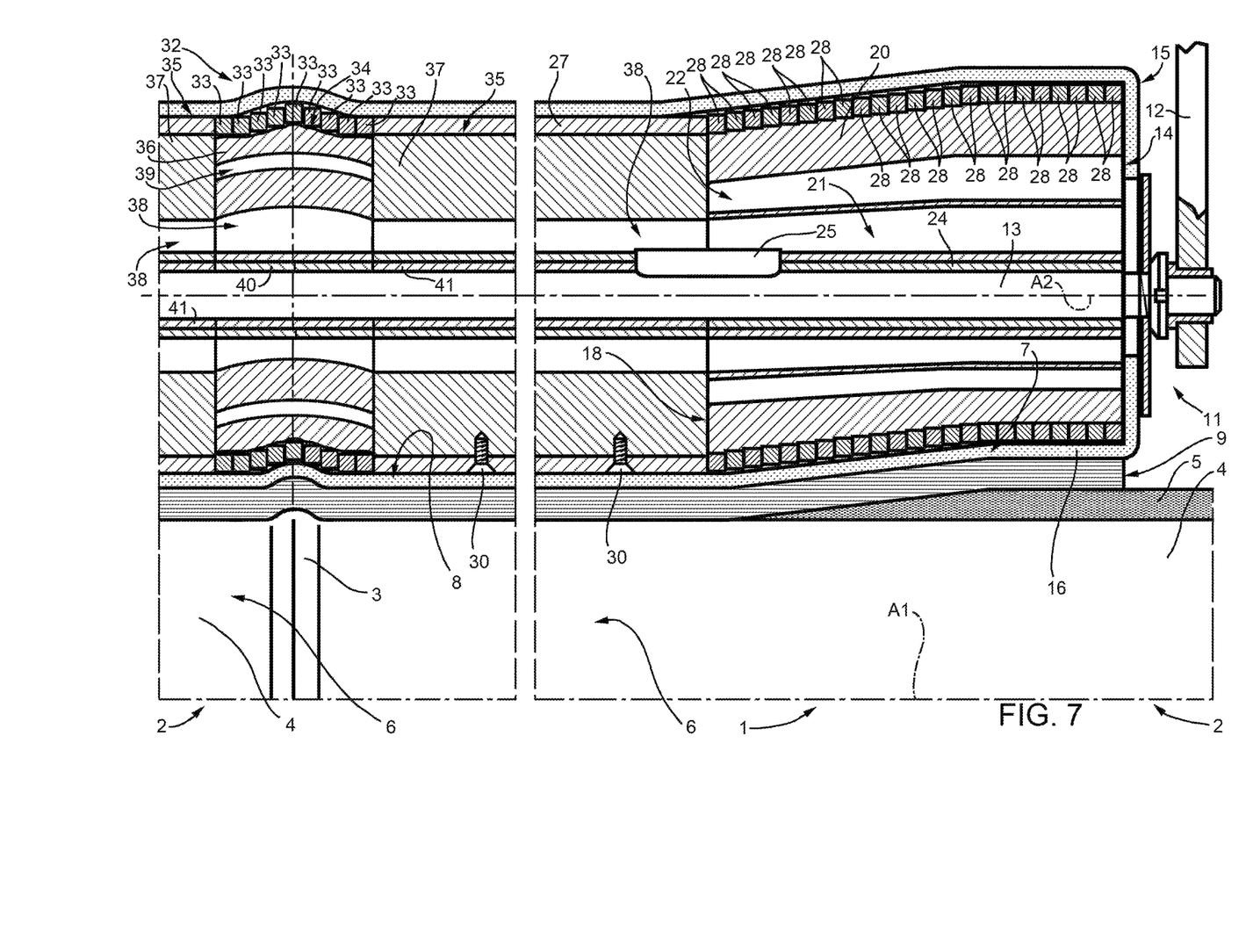
FIG. 7 shows a partly sectioned, larger-scale elevation, with parts removed for clarity, of a variation of the roller according to the present disclosure when compressing the protective sheeting onto the pipeline.

Number 32 in the FIG. 7 variation indicates a roller which differs from roller 10 in FIGS. 1-6 by having a different central structure. More specifically, the central cylindrical wall 26 of roller 10 (FIG. 6) is replaced with a plurality of rigid central cylindrical walls 33 which, in the FIG. 7 example, are identical to cylindrical end walls 28. Each central cylindrical wall 33 is relatively very small and, in the FIG. 7 example, is roughly the same size as central cylindrical wall 33.

Each central cylindrical wall 33 is slidable radially, with reference to axis A2, with respect to the adjacent central cylindrical walls 33 and intermediate cylindrical walls 27.

Roller 32 also differs from roller 10 by central tubular member 17 in FIG. 6 being replaced with a central tubular member 34, and two intermediate tubular members 35 located at opposite ends of central tubular member 34 and at intermediate cylindrical walls 27. Tubular members 34, 35 comprise respective tubular layers 36, 37 of elastic material, such as silicone, and have axial openings 38 and 39. The degree of elasticity of tubular layers 36 and 37 depends on the elastic material used, the number or quantity of axial openings 38 and 39, and the shape and size of the cross section of openings 38 and 39.

Tubular members 34, 35 comprise respective sleeves 40, 41 supporting respective tubular layers 36, 37.

In certain embodiments, tubular layers 36, 37 are cured to respective sleeves 40, 41, which are made of metal.

The other structural parts of roller 32 are identical to those of roller 10, and are indicated using the same reference numbers.

In the variation described, roller 32 is able to deform sufficiently at weld bead 3 to leave the thickness of protective sheeting 9 unchanged.

Also, the axial size of the center portion of roller 32 (i.e., the portion occupied by central cylindrical walls 33) is such as to even allow errors in the axial position of roller 32 with respect to weld bead 3.

Clearly, changes may be made to the embodiment of the present disclosure described with reference to the attached drawings without, however, departing from the protective scope of the accompanying Claims. For example, in a variation not shown, the second tubular portion and/or the sheath are/is omitted. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pipeline protective sheeting compression roller comprising:
   a shaft configured to rotate about an axis of rotation;
   at least one first tubular portion which extends about the shaft and is configured to rotate about the axis of rotation, wherein the at least one first tubular portion varies in elasticity along the axis of rotation such that when the at least one first tubular portion compresses a protective sheeting of polymer material around a cutback of a pipeline including a raised portion, part of the at least one first tubular portion deforms for the raised portion of the pipeline to not alter a thickness of the protective sheeting; and
   a second tubular portion which is fitted about the first tubular portion and includes a plurality of cylindrical walls movable with respect to one another and arranged end to end along the axis of rotation.

2. The pipeline protective sheeting compression roller of claim 1, wherein the at least one first tubular portion includes a plurality of tubular members arranged end to end along the axis of rotation.

3. The pipeline protective sheeting compression roller of claim 2, wherein at least two of the adjacent tubular members differ in elasticity.

4. The pipeline protective sheeting compression roller of claim 2, wherein the tubular members include two lateral tubular members of greater elasticity than an adjacent tubular member.

5. The pipeline protective sheeting compression roller of claim 2, wherein each tubular member includes a tubular layer.

6. The pipeline protective sheeting compression roller of claim 5, wherein the tubular layer of each tubular member includes a layer of silicone.

7. The pipeline protective sheeting compression roller of claim 5, wherein each tubular layer defines a plurality of axial openings equally spaced about the axis of rotation.

8. The pipeline protective sheeting compression roller of claim 5, wherein each tubular member includes a sleeve supporting the tubular layer and fitted to the shaft.

9. The pipeline protective sheeting compression roller of claim 1, wherein the second tubular portion includes a central cylindrical wall defining a groove.

10. The pipeline protective sheeting compression roller of claim 9, wherein the second tubular portion includes two intermediate cylindrical walls located at opposite ends of the central cylindrical wall.

11. The pipeline protective sheeting compression roller of claim 1, wherein the second tubular portion includes a plurality of central cylindrical walls each radially slidable with reference to the axis of rotation with respect to adjacent cylindrical walls.

12. The pipeline protective sheeting compression roller of claim 11, wherein the second tubular portion includes two intermediate cylindrical walls located at opposite ends of the central cylindrical walls.

13. The pipeline protective sheeting compression roller of claim 1, wherein the second tubular portion includes a plurality of lateral cylindrical walls located at opposite ends of the roller.

14. The pipeline protective sheeting compression roller of claim 1, which includes a sheath of greater elasticity than the shaft and configured to define an outer surface configured to be positioned contacting the protective sheeting.

15. A roller comprising:
   a shaft;
   a first tubular portion which extends about the shaft and which varies in elasticity along an axis of rotation;
   a second tubular portion fitted about the first tubular portion and including:
      a plurality of central cylindrical walls arranged end to end along the axis of rotation, wherein each of the central cylindrical walls is radially slidable with reference to the axis of rotation with respect to at least an adjacent one of the cylindrical walls, and at least one of the plurality of central cylindrical walls defines a groove, and
      two intermediate cylindrical walls located at opposite ends of the plurality of central cylindrical walls; and a sheath configured to define an outer surface configured to be positioned contacting a protective sheeting of polymer material configured to be compressed around a cutback of a pipeline.

16. The roller of claim 15, wherein the first tubular portion includes a plurality of tubular members arranged end to end along the axis of rotation.

17. The roller of claim 16, wherein at least two of the adjacent tubular members differ in elasticity.

18. The roller of claim 16, wherein the tubular members include two lateral tubular members of greater elasticity than an adjacent tubular member.

19. The roller of claim 16, wherein each tubular member includes a tubular layer.

20. The roller of claim 19, wherein each tubular layer defines a plurality of axial openings equally spaced about the axis of rotation.

21. The roller of claim 19, wherein each tubular member includes a sleeve supporting the tubular layer and fitted to the shaft.

22. A roller comprising:
a shaft; and
a first tubular portion which extends about the shaft and which varies in elasticity along an axis of rotation;
a second tubular portion fitted about the first tubular portion and including:
a plurality of central cylindrical walls arranged end to end along the axis of rotation, two intermediate cylindrical walls located at opposite ends of the central cylindrical walls, and
a plurality of lateral cylindrical walls located at opposite ends of the roller, wherein the central cylindrical walls are each radially slidable with reference to the axis of rotation with respect to adjacent cylindrical walls; and
a sheath configured to define an outer surface configured to be positioned contacting a protective sheeting of polymer material configured to be compressed around a cutback of a pipeline.

23. The roller of claim 22, wherein the first tubular portion includes a plurality of tubular members arranged end to end along the axis of rotation.

24. The roller of claim 23, wherein at least two of the adjacent tubular members differ in elasticity.

25. The roller of claim 23, wherein the tubular members include two lateral tubular members of greater elasticity than an adjacent tubular member.

26. The roller of claim 23, wherein each tubular member includes a tubular layer.

27. The roller of claim 26, wherein each tubular layer defines a plurality of axial openings equally spaced about the axis of rotation.

28. The roller of claim 26, wherein each tubular member includes a sleeve supporting the tubular layer and fitted to the shaft.

* * * * *